United States Patent [19]

Mehnert

[11] 4,028,954

[45] June 14, 1977

[54] SLIP-FREE SHEAVE OR PULLEY

[75] Inventor: Walter Mehnert, Ottobrunn, Germany

[73] Assignee: Institut fuer industriellen Fortschritt AG, Liechtenstein

[22] Filed: Mar. 15, 1976

[21] Appl. No.: 666,675

[30] Foreign Application Priority Data

Mar. 19, 1975  Germany ................. 2511889

[52] U.S. Cl. ............... 74/230.01; 74/577 S; 192/46

[51] Int. Cl.² ............ F16H 55/36; G05G 1/00; F16D 13/04

[58] Field of Search ...... 74/230.01, 230.03, 577 S; 192/46

[56] References Cited

UNITED STATES PATENTS

| | | | |
|---|---|---|---|
| 2,770,142 | 11/1956 | Margrey | 74/230.01 X |
| 2,884,286 | 4/1959 | Pieper | 74/230.01 X |
| 3,505,890 | 4/1970 | Peterson | 192/46 X |
| 3,606,938 | 9/1971 | Heyne | 192/46 X |

Primary Examiner—Leonard H. Gerin
Attorney, Agent, or Firm—W. G. Fasse; W. W. Roberts

[57] ABSTRACT

A slip-free sheave or pulley has a housing forming a carrier roller with a circumferential groove and beads bulging out of the side walls of said groove. Inside the carrier roller is a control ring and a force ring arranged partially side by side. A journaled latch pawl cooperates with one of its ends with the force ring. The latching end of the pawl cooperates with a control member rotatably supported in the housing, whereby the sheave may be locked in one direction and freely rotatable in the opposite direction, or vice versa, and whereby the sheave may be controlled through the rope to be changed from one state, for example locked, into another state, for example freely running.

11 Claims, 4 Drawing Figures

SLIP-FREE SHEAVE OR PULLEY

BACKGROUND OF THE INVENTION

The invention relates to a slip-free pulley suitable for use as a rope sheave, or cable sheave or even as a belt pulley. Such pulleys or sheaves are either locked in a predetermined rotational direction and rotatable freely in the opposite direction or control means are provided which permit a manual control of the pulley so that it may rotate freely in both directions. The invention also relates to a method for operating such a slip-free pulley or sheave and an arrangement for performing such method.

Numerous rope and cable guide rollers are known in the art, which are locked in a defined rotational direction and freely rotatable in the opposite direction. Control means are commonly provided for such sheaves or pulleys to select the direction of rotation in which the pulley shall be freely rotatable. Such additional control devices do not permit the control by one hand only. In addition, prior art devices are not readily suitable for remote control. Thus, in known pulleys, it cannot be avoided that in the arrested position of the pulley, the rope slides over the locked roller with substantial so called slip, whereby the rope is subject to substantial wear and tear.

German Patent Publication No. 22,32,740 described a free wheeling pawl clutch, whereby the pawls are supported without bolts in a pawl carrier. The pawl carrier is cylindrical and has a flattened portion in the range of each pawl. Cylindrical recesses are arranged in the flattened portion with their axes in parallel to each other to receive the pawl foot. These recesses are set back to such an extent relative to the cylindrical outer contour of the pawl carrier, that in the withdrawn position of the pawls, the latter do not reach into the range of the gear teeth of the ring which cooperates with the pawls. This known coupling according to German Patent Publication No. 22,32,740 is also locked in one rotational direction and does not permit the release or unlocking, if necessary.

OBJECTS OF THE INVENTION

In view of the foregoing, it is the aim of the invention to achieve the following objects singly or in combination:

to provide a method for operating a sheave or pulley in a slip-free manner, more specifically, to provide a pulley which may be switched over so that the free wheeling may be selected to permit rotation in one or the other direction without additional devices and structural elements;

to provide a pulley which can be operated by one hand and the free wheeling direction of which is selectable through the rope itself;

to provide a pulley of conventional dimensions which nevertheless may be controlled for locking or free wheeling in one or the other direction, whereby the selection is to be accomplished by remote control through the rope;

to combine the features of the pulley with the elements for locking the rope in an integral unit;

to provide a pulley which permits the hoisting and the lowering of a sail by one person solely by control through the respective rope itself;

to provide a pulley in which the selected conditions such as "locking", "free wheeling" may be maintained without any continuing effort; and to provide a pulley which is universally adapted for many different purposes, for example, for use on sailboats, in lifting mechanisms, in fishing reels and so on.

SUMMARY OF THE INVENTION

According to the invention there is provided a pulley which may be operated externally in such a manner that the additional control is accomplished exclusively by means of the rope or by means of the elements running over the pulley, such as a belt, whereby a pull is applied to the rope or belt, so that the original state of the pulley may be restored independently of the distance travelled by the element to which the pull is applied in the pulling direction and/or in the reverse direction except for a minimal response limit value. Thus, an original state of the pulley may be restored through a new state, whereby the pulley may be operated as follows. Pulling on the rope, reverse rotation of the pulley, pulling again on the rope, and further reverse rotation of the rope, whereby a switchover is accomplished, for example, from the condition locking through the condition, free wheeling, and back to the condition locking.

Due to the just described manner of operation, it is now possible that solely by a slight pull applied to the guided element, for example, the load end of the rope, the respective opposite state of the pulley may be accomplished depending on the preceding state. Thus, the locking, for example, may be released automatically without any additional devices and the free wheeling may take place in the opposite direction.

According to the invention the sheave or pulley comprises a single control member which is journaled in the housing of the pulley so that the axis of the control member has a constant defined spacing and/or angle relative to the main rotational axis of the pulley. The arrangement is such that the control member 10 takes up different angular positions defined by the mesh angle $\gamma$ when it extends out of the disk shaped main axis of the pulley or beyond the respective boundary line and when it returns into said disk-shaped main axis or boundary line. This movement out of and into the confines of the main axis is controlled by a control ring located in the pulley 15. The control ring 14 comprises at least one tooth and one tooth space located in the work angle $\alpha_1$. In other words, the control member 10 travels through said different meshing angles $\gamma$, whereby the work angle $\alpha_1$ corresponds to $\alpha_1 = \gamma_1 - \Delta\gamma_1$, wherein $\Delta\gamma_1$ represents a lead angle and whereby a pawl angle $\theta_1$ is defined as $\theta_1 = 360°/m_1$, wherein $m_1$ is an even number corresponding to the pitch or division of the pulley. In a modified embodiment, gear means are provided which transform the work angle. In that instance, the work angle $\alpha_2$ corresponds to $\alpha_2 = (z_1/z_2)$, $\alpha_1 = \gamma_2 - \Delta\gamma_2$ and $\theta_2 = (z_1/z_2)$. $\theta_1$ wherein $z_1$ and $z_2$ represent the number of teeth of the respective gear wheels. In both instances the work angle $\alpha_1$ and the transformed work angles $\alpha_2$ as well as the pawl angle $\theta$ trail or follow the meshing angle $\gamma_1$; $\gamma_2$ by an angle corresponding to $\Delta\gamma_1$; $\Delta\gamma_2$ which is called the lead angle. The control member 10 is arranged for cooperation with a trigger cam 23a, 23b or with a control ring 14 through a gear clutch 17. The gear clutch has a pitch of $m_1$ or $m_2$ and a work position defined as $\alpha_1 = \alpha_0 = 0$ or $\alpha_1 = \alpha_0 + \epsilon$ wherein $\epsilon$ is the angle of synchronism. The gear clutch also has a displacement angle $\tau$. The tooth and tooth space rotate in a predetermined functional sequence always through an angle $\theta$ or $\alpha$, thereby causing an even number of times the state locking or free wheeling. Simultaneously, the tooth actuates the locking pawl 19 which is journaled in the pulley and biased by a spring, into engagement with a recess in a so called force ring 21. A centering spring 22 tends to bias the control member 10 into a starting position, preferably the work position. A latching element is arranged on the trigger cam for determining a defined operating position, whereby to eliminate operating faults and faulty functions, which otherwise might add up. The latching element may be provided, if desired, with a back stop. The latching element lags in its starting position relative to its working position by the synchronizing angle $\epsilon = \alpha - \theta$ or $\epsilon = 0$, whereby the locking pawl 19 cooperates with said force ring 21. The force ring 21 is rotatably supported in the pulley housing or carrier roller 15, whereby the rotation of the force ring is limited to a compensation angle $\mu$. The housing comprises a circumferential groove, the side walls of which form guide surfaces comprising protruding beads or ridges for exactly clamping the element guided by the pulley, such as a rope or belt. A return spring 27 interconnects the force ring 21 with the control ring 14 for biasing the force ring into its end position defined by an arresting element. The cooperation of the just described elements causes the change of the instantaneous state of the pulley independently of the distance traversed by the rope or belt in the pulling direction and/or in the reverse direction, except for a minimal response limit value.

The above features in combination result in a pulley of conventional dimensions and shape while simultaneously permitting the control from one state to the other in an optimal manner. In this fashion a faultless kinetic solution has been provided for a remote controllable pulley independently of the distance traversed by the rope or belt. Thus, the operator is released of substantial labors which heretofore were necessary in order to remain functional at any time and in each position. In other words, heretofore, the operator had to hold on to the rope by exerting a substantial force on the rope. This has been eliminated according to the invention, since the operator can lock or release the pulley as desired at any time. One advantage of the invention is seen in that the operator is in each position operational without any exertion of substantial force. Yet another important advantage of the invention is seen in that the additional clamping devices required for prior art pulleys as externally located elements have been integrated into a single functional unit. This is an especially significant advantage in connection with pulleys used for sailboats because heretofore the clamping devices had to be secured to the body of the boat or deck. This has been obviated according to the invention. Thus, the dangers resulting heretofore from the fact that the operator could not reach the clamping elements or devices have been eliminated. This is especially important in connection with racing vessels, where the fact that the clamping devices could not be easily reached, was outright dangerous, especially when the boat has to be balanced. Thus, the present invention reduces the danger of accidents in connection with sailboats to a minimum.

The invention is also especially technically suitable in all those instances where the sail must be secured to the tip of the mast, for example, where such rigging is required by law for the load relief of the mast. In this instance the invention is especially advantageous, because it makes it possible to hoist and lower the sail instantaneously without any actuation of additional devices, and directly through the pulling rope, without any problems whatsoever.

Further, the invention is also suitable for other purposes, for example, in connection with rescue devices or operational devices employed in mountain climbing or rescue services, because in these instances the present pulley releases the operator in critical situations, even life endangering situations, because the operational conditions of the pulley may be selected and maintained without any substantial application of force.

The present pulley is also useful in connection with fishing equipment, in which the present pulley may be used as a guide pulley for the so called shroud line, whereby the line itself may be used to control the operational state of the pulley (locked, free wheeling). This was not possible heretofore in the most simple manner as described.

Moreover, the present pulley may be employed in heavy lifting equipment, whereby the present pulley constitutes an additional safety feature when it operates as a last roller in a sequence of rollers, especially during the lifting and holding condition of the equipment.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
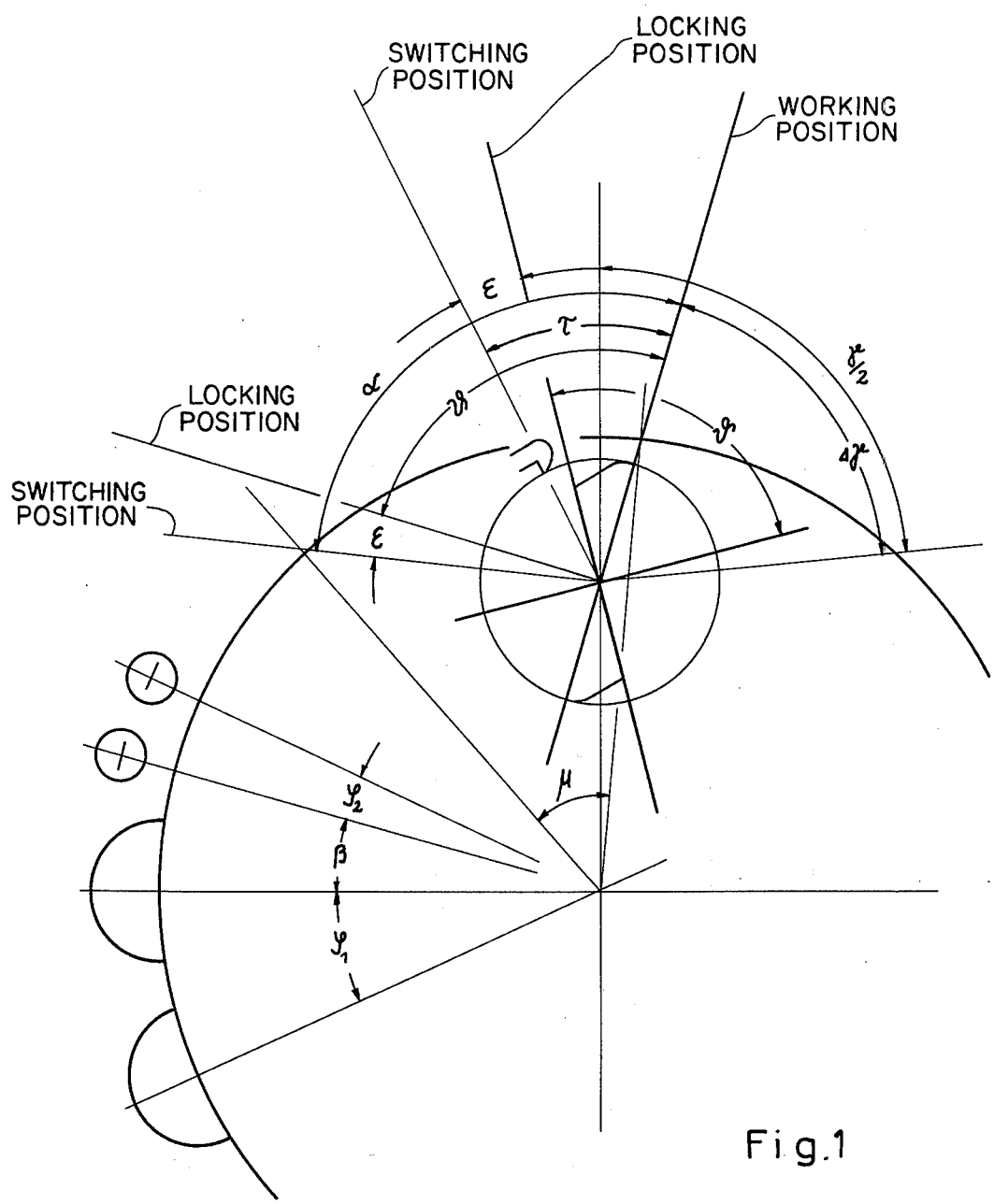
FIG. 1 illustrates the various angles and the theoretic operation of the pulley according to the invention.
Figure 3:
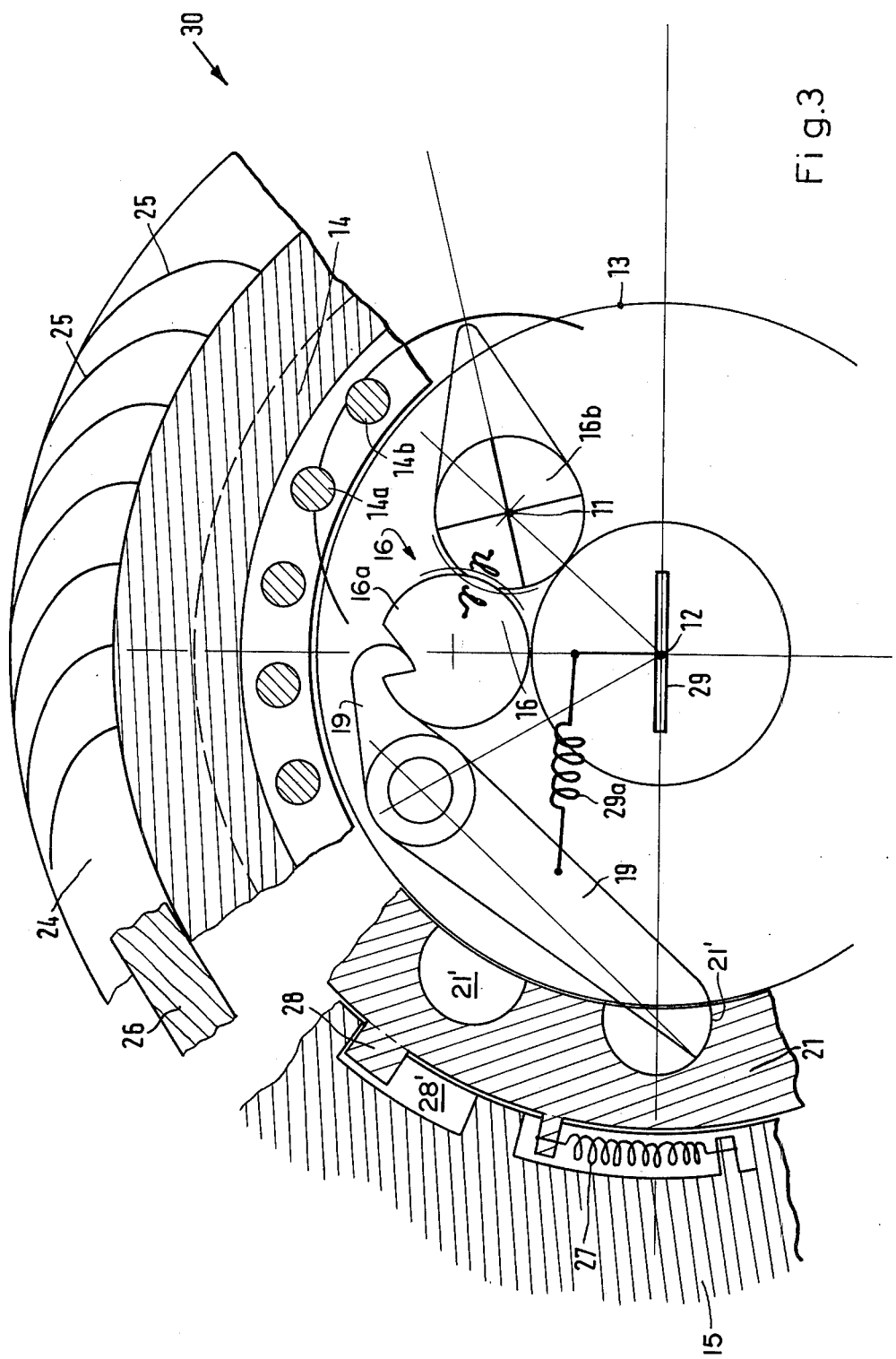
FIG. 3 is a partial view of a modified embodiment with additional gear means for reversing the function of the control member.

Referring to FIG. 1, there are shown in simplified manner the various angles involved in the operational sequence of the pulley 30 which itself is illustrated in more detail in FIG. 3. Ten angles determine the function of the present pulley 30. The size of these angles is determined by the pitch or division $m$, whereby $m$ is a whole even number. The larger the pitch $m$ is selected, the smaller will be the meshing angle $\gamma$ and thus the response sensitivity of the pulley will increase accordingly. In other words, a small meshing angle $\gamma$ corresponds to a high response sensitivity of the pulley.

The pawl angle $\theta$ is directly related to the pitch by the formula $\theta_1 = 360°/m_1$. The lead angle $\Delta\gamma$ defines the maximum extent by which the control member 10 dips into the space 14b between two teeth 14a in a control ring 14. These so called teeth 14a may, for example, be small rollers supported in the control ring 14, see FIGS. 2 and 3. The lead angle $\Delta\gamma$ also determines the work position whereby it is necessary to maintain the condition that $\Delta\gamma<\theta$ in order to eliminate erroneous switching from one state to another.

The work angle $\alpha$ is determined by the given angle $\theta$ and a synchronization angle $\epsilon$ which assures the elimination of malfunctions of the locking element 23 in its locked positions. The displacement angle $\tau$ is the angle between the work position of the control member 10 and the switching position of the trigger cam 23b. The work position of the control member 10 is such, that the longitudinal axis of the control member 10 coincides with one axis of the cross of the gear clutch 17. The pitch angle $\rho_1$ relates to the force ring 21. The pitch angle $\rho_2$ relates to the control ring 14. These two pitch angles should be as small as possible to obtain a high response sensitivity of the pulley. However, the control member 10 limits the size of the pitch angle $\rho_2$ and thus indirectly also the size of the pitch angle $\rho_1$. Thus, both these angles are influenced by the control member 10.

The compensation angle $\mu$ represents the angle between the operated position of the control member 10 and the work position of the control member 10 relative to the main axis 12 of the pulley. Thus, this compensating angle $\mu$ defines directly the circumferential length of the groove 28' in the pulley housing 15 and into which groove 28' the stop member 28 secured to the force ring 21 extends. Thus, the stop member 28 limits the extent of rotation of the force ring 21. When the force ring reaches its stopped position, the control member 10 is with certainty in its work position.

The connecting or intermediate angle $\beta$ is located between the two pitch angles $\rho_1$ and $\rho_2$ and designates the displacement of the force ring 21 relative to the control ring 14, when the latter is in its 0 position. This angle $\beta$ makes it possible that the control member 10 of the pulley 30 is in its work position when the pulley state is locking. Thus, without delay, the state free wheeling may be initiated.

Figure 2:
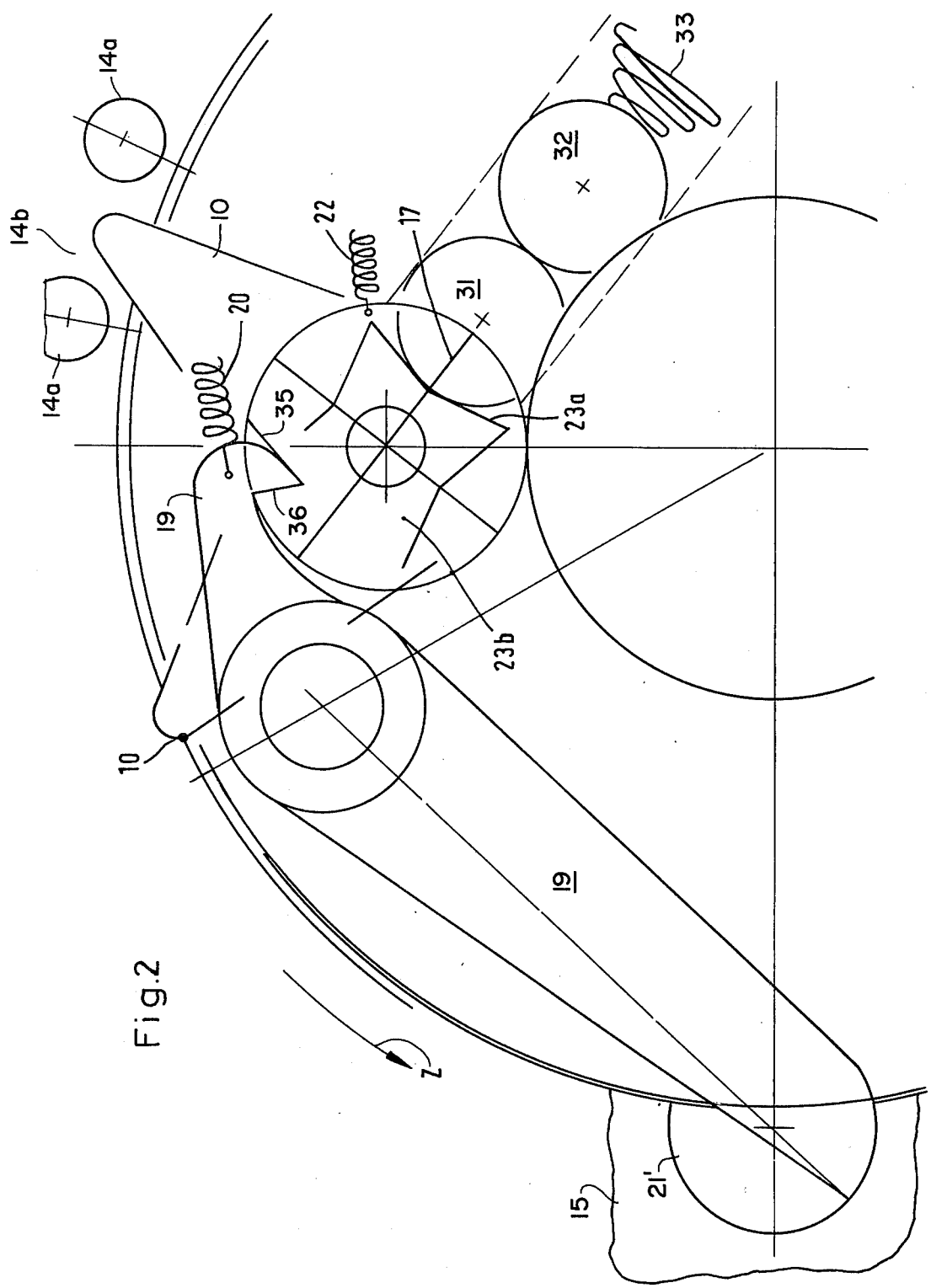
FIG. 2 shows a partial side view of the present pulley with the functional arrangement of the control member, the trigger cam, the locking pawl and the gear clutch having a pitch or division of $m = 4$.

FIG. 2 illustrates the cooperation of the control member 10, the trigger cam 23b, and the locking pawl 19. The direction of pull applied by the rope 26 (FIG. 3) is shown by the arrow Z in FIG. 2. As soon as the control member 10 reaches its work position, it actuates the gear clutch 17 due to said pull Z by the rope 26, whereby the trigger cam 23b, upon passing through the work angle $\alpha$ switches the locking pawl 19 either into its locking or into its free wheeling position. When the housing or carrier roller 15 of the pulley rotates now in the opposite direction, the control member 10 is rotated through the angle $\alpha$ by means of the rollers 14a, which operate as gear teeth in the control ring 14 and through the centering spring 22, thus bringing the control member 10 into the working position, alternatively, the control member 10 is returned into the next position in which it dips into the tooth space 14b, thereby traversing the angle $\gamma$. In both of these instances, no switching of the state of the pulley takes place, because the control member 10 switches only in response to rotation of the pulley in the direction of pull Z. The trigger cam 23 may be arrested, for example, by locking balls 31, 32 and a respective locking spring 33.

FIG. 3 illustrates two different sectional views. The left-hand portion of the figure shows a sectional view along the section line A–B in FIG. 4, whereas the upper portion of FIG. 3 shows a sectional view along section line C–D in FIG. 4.

FIG. 3 further illustrates an embodiment in which the direction of the effectiveness of the control member 10 relative to the locking pawl 19 is reversed. The reversal is accomplished by means of a gear 16 including gear wheels 16a and 16b. With the aid of the gear 16 it is possible to freely select the latching or pawl angle $\theta_2$ of the control member 10. Depending upon the ratio between the gear wheels 16a and 16b, the latching angle may be reduced to the standard size of the angle $\theta_1 = 360°/m_1$.

The inner wall surfaces of the groove in the carrier roller or housing 15 of the present pulley are provided with beads or ridges 25 which assure the desired clamping of the row 26. These beads or ridges 25 have such a curvature that the rope 26 is easily released from the clamping condition in response to a pull in the opposite direction. When the rope 26 is pulled counter-clockwise in FIG. 3, it will be released from the clamping action because it will tend to ride up on the beads 25. Similarly, when the rope is pulled clockwise in FIG. 3, it will tend to be clamped because the beads 25 will tend to push the rope downwardly toward the bottom of the groove in the pulley. This feature of the invention has the advantage that even if the rope is fully clamped down against the bottom of the groove by a load pulling in the clockwise direction, it may easily be released from this clamping action by the beads 25 in response to a slight pull in the counter-clockwise direction.

The return spring 27 interconnects the housing or carrier 15 of the pulley with the force ring 21, whereby the stop member 28 and with it the force ring 21 is biased into a definite starting position. In this position, the locking pawl 19 gets into its locking position and immediately initiates the locked state of the pulley. Simultaneously, the carrier or housing 15 returns the control member 10 into its operating position due to the play resulting from the angle $\mu$. The force ring 21 is provided with recesses 21' which are engaged by the rear end of the locking pawl 19 in the locking position.

FIG. 3 further illustrates a hand operable handle 29 connected through a spring 29a to the locking pawl 19 for deliberately disengaging the rear end of the locking pawl 19 from the recesses 21' of the force ring 21. By means of this handle 29 it is thus possible to make the present pulley free wheeling in both directions. The main axis 12 of the pulley extends in parallel to the axis 11 of the control member 10. The outer diameter of the circle 13 may be considered to be the outer diameter of the shaft. The circumference of the circle 13 corresponds substantially to the point of entry or to the point of exit of the control member 10 relative to the housing 15 of the pulley. The tooth spacing 14b between the teeth 14a in the control ring 14 corresponds with its dimensions substantially to the dimensions of the control member 10 and to the extent by which the control member 10 dips into these tooth spaces 14b.

Figure 4:
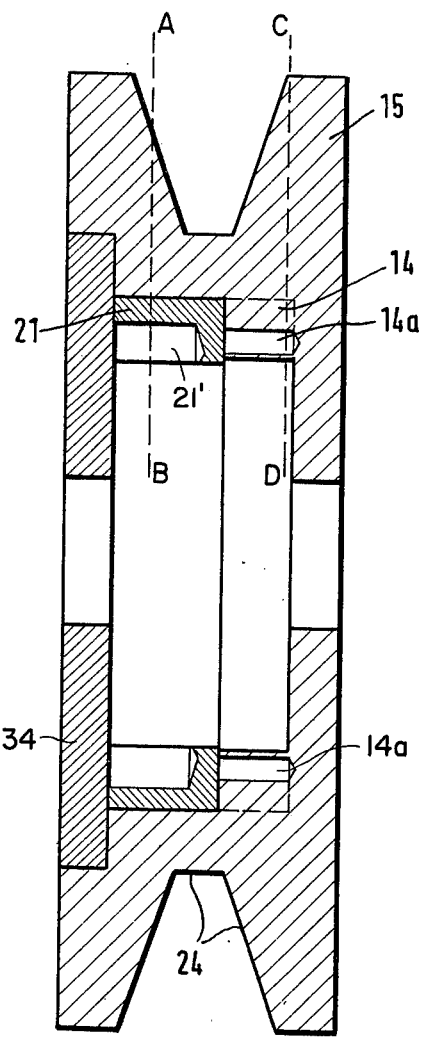
FIG. 4 illustrates a sectional view through the pulley without the main axis.

FIG. 4 illustrates a central sectional view through a pulley according to the invention, whereby the pawl and control member have been omitted from simplicity's sake. The control ring 14 may form part of the outer housing or carrier roller 15. The teeth 14a in the form of little rollers are inserted into the control ring 14 and held in position by the force ring 21, which in turn is prevented from falling out of the housing 15 by a cover member 34. The side walls 24 of the groove in the circumference of the housing 15 are provided with beads or ridges 25 as described above for guiding the rope 26.

In operation, the rope 26 runs in the pulling direction Z freely over the pulley 30 or rather through the groove. If the original state of the pulley was, for example locking, such state may be changed into free wheeling simply by pulling on the rope itself in the opposite direction. Thus, the rope will now run in the opposite direction until the state of the pulley is changed again by a further pull to restore the original state of locking or now rather "again locking". Such state "again locking" becomes almost instantaneously effective except for a slight reverse movement of the pulley corresponding to the so called response limit value. A further pull on the rope establishes again the opposite state of the pulley, namely, free wheeling in the assumed example. It is an advantage of the invention that this switching from one state to the other can be repeated as often as desired, and in a rapid sequence, even under different loads. Such rapid changes and different loads do not effect whatsoever the safety and operability of the pulley according to the invention.

In view of the above description, it will be appreciated that it is possible to eliminate the equalization angle $\mu$ between the force ring 21 and the housing 15 or the control ring 14 by deriving the switching impulse from the reverse direction of the pulley. For achieving this, it is necessary to modify the present pulley by replacing the single control member 10, which is effective in but one direction, either with a control member having two effective directions or by replacing the single control member with two control members connected through a gear drive and each effective in the direction opposite to that of the other control member. In this manner it is possible to increase the response sensitivity of the pulley relative to changes in the direction of rotation, whereby simultaneously the force necessary for the switch-over is reduced. In other words, the threshold force necessary to accomplish the switchover is smaller.

In the above described modification with an externally controlled mechanism 29, 29a, which may be hand controlled and/or remote controlled, it is possible to switch out of operation altogether the locking mechanism. Such a feature is especially desirable on sailboats where, for instance, the roller should run freely where there is hardly any wind so that any movements of the sail can be sensed by the operator holding the rope.

Preferably, the teeth 14a are formed as rollers as described above, in order to avoid any jamming between the control member 10 and the control ring 14. In a modification, it is possible to support the rollers rotatably in the control ring 14. Moreover, the control member 10 may comprise a rotatable element or the control member may itself act as a spring element. Yet another modification according to the invention provides that the control ring 14 is rotatably supported in the housing 15 and biased by spring means. This feature assures an absolutely exact motion or functional sequence of the elements inside the roller housing 15.

Incidentally, the above described ridges or beads on the surface of the walls 24 of the groove have preferably such a curvature that the respective slope steadily diminishes from the inner bottom of the groove toward the outer circumference of the pulley in such a manner that the rope will tend to contact these beads or ridges at a right angle when the pulley rotates in the reverse direction. This feature has the advantage that the rope is released from the clamping action substantially without any application of force, and that the desired switch-over from one state to the other is accomplished in a most efficient manner.

Further, with regard to the operation of this pulley, in the dashed line left position of the control member 10, the latching end of the pawl 19 is disengaged from the notch in the gear clutch 17. Therefore, the lower locking end of the pawl 19 is also disengaged from the force ring 21. A pull on the rope in the clockwise direction will restore the control member 10 to the full line position shown in FIG. 2. To facilitate the disengagement of the latching end of the pawl 19 from the notch in the gear clutch, the notch has a slanted wall portion 35 on which the pawl end can ride up. The notch has also a substantially radially extending wall 36 to facilitate the latching.

What is claimed is:

1. A rope or belt pulley comprising, a housing (15), a circumferential groove in said housing, a cavity located centrally in said housing, a control ring (14) in said cavity, gear means (14a) in said control ring, force ring means (21) supported for limited angular movement in said cavity substantially adjacent to said control ring, pawl means (19) having a latching end and a locking end, journal means journaling said pawl means intermediate said ends, control means also journaled in said cavity for cooperation with said gear means of said control ring and with said latching end of said pawl means, inwardly facing recesses in said force ring means (21) for cooperation with said locking end of said pawl means, first spring bias means (20) biasing said pawl means (19), second spring bias means (22) biasing said control means, said circumferential groove having walls with inwardly protruding curved ridges for controlling the position of the rope or belt means in said circumferential groove depending on the direction of rotation of said pulley housing, whereby a pull on said rope or belt means in the respective reverse direction changes an existing state of the pulley into the opposite state so that such states may be rapidly changed by repeated pulling on said rope in the respective reverse direction.

2. The rope or belt pulley according to claim 1, wherein said gear means (14a) in said control ring are rollers evenly spaced from each other in said control ring and facing toward said cavity, said rollers being rotatably supported in said control ring.

3. The rope or belt pulley to claim 1, wherein said control ring (14) and said housing (15) form a integral structure.

4. The rope or belt pulley according to claim 1, wherein said control means comprise a control member (10) biased by said first spring bias means, a gear clutch (17), said spring biased control member being secured to said gear clutch (17), trigger cam means (23a, 23b) forming part of said gear clutch, third biasing means (31, 32, 33) biasing said gear clutch (17) into predetermined positions, and notch means on said control member (10) arranged for cooperation with said latching end of said pawl means, said notch means having a substantially radially extending wall for interlocking with said latching end of said pawl means, whereby said locking end of said pawl means simultaneously engages one of said recesses (21') in said force ring (21), said notch means further having a slanted wall portion along which the latching end of said pawl means may ride up in response to an unlatching movement of said control member 10, whereby said locking end of said pawl means simultaneously becomes disengaged from the respective recess in said force ring.

5. The rope or belt pulley according to claim 1, having a main rotational axis, wherein said control means comprise a single control member (10) having a journal axis spaced from said main rotational axis, a control ring (14) having at least one tooth (14a) and one tooth space (14b) taking up a work angle $\alpha_1$, said control member taking up different meshing angles $\gamma$ relative to said control ring, whereby $\theta_1 = \gamma - \Delta\gamma$ wherein $\Delta\gamma$ is a lead angle, and wherein a pawl angle $\theta_1 = 360°/m_1$, $m_1$ being a whole, even number, trails behind said meshing angle $\gamma$ by said lead angle $\Delta\gamma$, said control means further comprising gear clutch means (17) having a displacement angle $\tau$, and a division of $m_1$, and taking up a work position $\theta_1 = \alpha_0 = 0$, a control ring (14) arranged for cooperation with said gear clutch (17) through said control member, said control ring and gear clutch rotating through said angles $\theta_1$ and $\alpha_1$ respectively in response to a pull on said rope or pulley in the reverse direction, said pawl means (19) inside said pulley being responsive to said rotating of said control ring and gear clutch, said first spring means (20) urging said pawl means (19) into locking engagement with one of said recesses in said force ring means, said second spring bias means (22) urging said control member (10) into a starting position, said gear clutch means (17) comprising trigger cam means (23a, 23b) which trails in its neutral position relative to the work position by $\epsilon = \alpha_1 - \theta_1$, wherein $\epsilon$ is a synchronizing angle, said force ring (21) being rotatable relative to said pulley housing by a compensation angle $\mu$, said control means further comprising a spring (27) holding said force ring (21) in a determined end position, and stop means (28) as part of said force ring (21), as well as groove means (28') in said housing determining said end position, whereby said control member (10) establishes sequentially locked and free wheeling states in response to a pull on said rope or belt in a direction opposite to a load imposed pull substantially independently of the length of travel of said rope or belt.

6. The rope or belt pulley according to claim 5, wherein said control means comprise two gear wheels (16a, 16b), said control member (10) being secured to one of said gear wheels, whereby a second work angle $\alpha_2$ corresponds to $\alpha_2 = (z_1/z_2) \alpha_1 = \alpha_2 - \Delta\gamma_2$ wherein $z_1$ is the number of teeth on one gear wheel and $z_2$ is the number of teeth on the other gear wheel, and wherein the pawl angle $\theta_2 = z_1/z_2 \theta$; and trails behind the mesh angle $\gamma_1$, $\gamma_2$ by $\Delta\gamma_1$ and $\Delta\gamma_2$ respectively, said gear clutch (17) having a division of $m_1$ or $m_2$ and a work position of $\alpha_0 + \epsilon$, wherein $\alpha_0$ defines a starting position and $\epsilon$ is a synchronizing angle, said gear clutch also having a displacement angle $\tau$, said two gear wheels eliminating said compensation angle, said control member being responsive to the reverse rotation of said pulley housing.

7. The rope or belt pulley according to claim 5, wherein said control member (10) is responsive to but one direction of rotation of said control ring (14).

8. The rope or belt pulley according to claim 5, wherein said control member (10) is responsive to two directions of rotation of said control ring (14).

9. The rope or belt pulley according to claim 1, further comprising external means (29) as part of said pulley and interconnecting means (29a) connecting said external means to said pawl means for switching said pawl means into and out of an ineffective rest position.

10. The rope or belt pulley according to claim 1, wherein said ridges protruding from the walls of the circumferential groove have such a curvature that a pull on the rope or belt in the reverse direction tends to clamp the rope or belt in the groove.

11. The rope or belt pulley according to claim 10, wherein said curvature of said protruding ridges is such that the slope of the curvature decreases radially outwardly and as viewed in the direction (z) of pull on the rope or belt for controlling the state of the pulley, said decreasing slope assuring that the rope or belt will extend substantially at right angles relative to the ridges when the rope or belt tends to escape from said circumferential groove in the reverse direction.

* * * * *